United States Patent
Krock et al.

(10) Patent No.: US 7,658,843 B2
(45) Date of Patent: Feb. 9, 2010

(54) DEEP SEA WATER HARVESTING METHOD, APPARATUS, AND PRODUCT

(75) Inventors: Hans J. Krock, Honolulu, HI (US); Stephen K. Oney, Honolulu, HI (US)

(73) Assignee: DSH International, Inc., Honolulu, HI (US)

( * ) Notice: Subject to any disclaimer, the term of this patent is extended or adjusted under 35 U.S.C. 154(b) by 288 days.

(21) Appl. No.: 11/444,899

(22) Filed: May 31, 2006

(65) Prior Publication Data

US 2007/0039860 A1    Feb. 22, 2007

Related U.S. Application Data

(60) Provisional application No. 60/686,191, filed on May 31, 2005.

(51) Int. Cl.
*B01D 61/08* (2006.01)
*F16L 1/15* (2006.01)
*B01D 61/00* (2006.01)

(52) U.S. Cl. .................. 210/170.11; 210/170.01; 210/321.6; 210/652; 405/154.1; 405/166; 405/168.1

(58) Field of Classification Search ............ None
See application file for complete search history.

(56) References Cited

U.S. PATENT DOCUMENTS

| | | | | |
|---|---|---|---|---|
| 3,440,146 A | | 4/1969 | Louw | 203/11 |
| 3,467,013 A | * | 9/1969 | Conner | 417/244 |
| 3,468,762 A | | 9/1969 | Klitzsch | 202/186 |
| 3,841,254 A | | 10/1974 | Dragonas | 114/77 |
| 3,928,145 A | | 12/1975 | Othmer | 203/11 |
| 4,078,975 A | | 3/1978 | Spears, Jr. | 203/10 |
| 4,172,766 A | | 10/1979 | Laing et al. | 202/173 |
| 4,233,153 A | | 11/1980 | Hammel et al. | 203/10 |
| 4,293,240 A | | 10/1981 | Ogimoto et al. | 405/195 |
| 4,302,297 A | | 11/1981 | Humiston | 202/185 R |
| 4,311,012 A | | 1/1982 | Finley | 60/641.7 |
| 4,356,785 A | | 11/1982 | Baile | 114/264 |
| 4,452,696 A | * | 6/1984 | Lopez | 210/170.11 |
| 4,568,522 A | | 2/1986 | Corbett | 422/186 |
| 4,618,421 A | * | 10/1986 | Kantor | 210/170.09 |
| 4,993,348 A | | 2/1991 | Wald | 114/265 |
| 5,229,005 A | | 7/1993 | Fok et al. | 210/652 |
| 5,306,397 A | | 4/1994 | Schmidt | 203/11 |

(Continued)

FOREIGN PATENT DOCUMENTS

DE          197 34 981 A1     6/1998

(Continued)

OTHER PUBLICATIONS

Lampe, H., et al., "PCs-Preussag Conversion System Mobile floating seawater desalination plant", Desalination 114, pp. 145-151, (1997).

(Continued)

*Primary Examiner*—Krishnan S Menon
(74) *Attorney, Agent, or Firm*—Ladas & Parry LLP

(57) ABSTRACT

Sea water is extracted from a depth in excess of 400 meters below the sea surface and desalinated to produce potable water. A system to extract, desalinate and store the desalinated sea water is mounted aboard a ship.

30 Claims, 3 Drawing Sheets

U.S. PATENT DOCUMENTS

| | | | |
|---|---|---|---|
| 5,582,691 A | 12/1996 | Flynn et al. | 203/11 |
| 5,840,159 A | 11/1998 | Rosenblad | 203/10 |
| 5,914,041 A * | 6/1999 | Chancellor | 210/641 |
| 5,970,846 A | 10/1999 | Roehr | 99/276 |
| 6,223,669 B1 | 5/2001 | Bowden | 114/65 |
| 6,694,910 B1 | 2/2004 | Sharapov | 114/264 |
| 7,153,423 B2 | 12/2006 | Gordon | 210/242.1 |
| 7,306,724 B2 | 12/2007 | Gordon | 210/241 |
| 7,455,778 B2 | 11/2008 | Gordon | 210/652 |
| 7,510,658 B2 | 3/2009 | Gordon | 210/652 |
| 2003/0024803 A1 | 2/2003 | Max | 203/10 |
| 2004/0065614 A1 | 4/2004 | Gordon et al. | 210/650 |
| 2004/0084156 A1 | 5/2004 | Hata | 159/47.1 |
| 2004/0206681 A1 * | 10/2004 | Gordon | 210/259 |
| 2005/0082214 A1 | 4/2005 | Max | 210/220 |

FOREIGN PATENT DOCUMENTS

| | | |
|---|---|---|
| DE | 102 11 788 A1 | 10/2003 |
| EP | 0 968 755 A | 1/2000 |
| ES | 2 165 824 A1 | 3/2002 |
| WO | PCT/US03/26726 | 8/2003 |
| WO | PCT/US04/038535 | 11/2004 |
| WO | PCT/US05/14066 | 4/2005 |
| WO | PCT/US06/24074 | 6/2006 |
| WO | PCT/US07/05077 | 2/2007 |

OTHER PUBLICATIONS

U.S. Appl. No. 11/471,747, Gordon, filed Jun. 2006.
U.S. Appl. No. 11/513,602, Gordon, filed Aug. 2006.

* cited by examiner

DEEP SEA WATER HARVESTING METHOD, APPARATUS, AND PRODUCT

RELATED APPLICATIONS

This patent application claims the priority of U.S. Provisional Patent Application Ser. No. 60/686,191 filed on May 31, 2005, titled "Deep Sea Water Harvesting," the entire contents of which are incorporated herein by reference.

TECHNICAL FIELD

This disclosure relates to deep seawater procurement, desalination and distribution and includes a globally unique process for mobile desalination and bulk distribution of deep seawater.

BACKGROUND

Over 70% of the planet's surface is covered by water. Of all the available water on the planet, only 2.5% is fresh water, the remaining 97.5% is seawater. Of the 2.5% fresh water on the planet, only 0.4% is readily available for human usage with a majority of the earth's fresh water stored as ice at the poles or as inaccessible ground water.

There is a shortage of water suitable for drinking and water suitable for commercial use. In some countries, long-lasting drought and critical water shortages have reduced economic growth and may eventually cause the depopulation of villages, towns, and entire regions. An abundance of fresh water exists in other parts of the world, but in many cases the water is polluted with chemicals from industrial sources and agricultural practices.

Humanity faces major challenges in meeting our future water needs. There are over 300 million people living in regions with severe water shortages. That number may increase to 3 billion by 2025. The United Nations reports that about 9500 children die each day because of low quality drinking water. The increase in the world population has caused a corresponding increase in the demand for portable drinking water, while the amount of water available has not changed. Ongoing, we need to create or find new water resources at a price-point and in a way that supports both economic growth and environmental guardianship.

Over the last half century, there has been a 300 percent increase in water consumption. All of the continents are experiencing falling water tables: this is especially true for the Southern Great Plains of the United States, the Southwest United States, Northern Africa, Southern Europe, the Middle East, Southeastern Asia, and China. Therefore, as fresh water resources are used up and polluted by mankind; we are forced to consider the largest water supply on Earth, the oceans and seas.

Evaporation and reverse osmosis are two typical methods of producing potable water from sea water or salt water. Evaporation methods involve heating the sea water to produce water vapor, condensing the water vapor, and then separating the condensed water from the sea water. Reverse osmosis is a process utilizing a membrane in which solutions are purified using hydraulic pressure. The salt ions or other contaminants are omitted by the reverse osmosis membrane while purified water is pressed through the membrane. Reverse osmosis can remove about 95% to 99% of the dissolved salts, silica, colloids, biological materials, pollution, and other contaminants from the water.

The largest known supply of water are the oceans. The desalination of ocean water by means of a land-based plant presents many problems for an output large enough to satisfy a large population. For example, the purification of oceanwater through evaporation methods consume enormous amounts of energy for land-based plants.

Land-based plants that purify water through reverse osmosis methods create larges amounts of effluent made up of the dissolved solids removed from the sea water. This effluent, or concentrate, has such a high concentration of dissolved solids and salts, that simply dumping the concentrate into the surrounding waters would eventually kill the surrounding marine life and hurt the local ecology, for a land-based plant. Also, the effluent that emerges from land-based reverse osmosis water purification plants has a higher density than sea water, therefore, the concentrate sinks and does not mix efficiently with the sea water when typically dumped into the surrounding water of a land-based plant.

In addition, dumping the effluent into the surrounding water would incrementally increase the salinity of the water taken into the land-based plant and clog the membranes of the reverse osmosis system. When a membrane in a reverse osmosis system is severely clogged it must be removed and treated to remove the clogging material. In some cases, the clogging material cannot be eliminated and the membrane must be discarded and replaced.

Hence, it can be seen that potable water produced from reverse osmosis desalination plants based on land is expensive and creates large engineering problems for disposing of the produced effluent. Therefore, despite the shortage of fresh water, only a small percentage of the world's potable water is produced by reverse osmosis methods. The need exists for a system of consistently and reliably generating potable water using a desalination technology that does not have the engineering and environmental issues that a land-based seawater purification plant presents.

To date, fresh water production from the ocean has focused on the desalination of easily accessible surface seawater through energy intensive coastal facilities. Unfortunately, coastal surface waters suffer from much of the same contamination sources and human interference as do ground water and municipal water supplies. However, there is a source of pure, uncontaminated water which has yet to be tapped, deep ocean water.

Deep ocean water starts its long journey from the polar regions to the tropical zone by moving along the world's "deep water conveyor" through thermohaline circulation. Originating at the poles where fresh water freezes and leaves denser, colder water to sink to the depths of the ocean, this deep water then travels along the ocean bottom towards the tropical regions to replace water being evaporated from the surface at a rate of approximately 1 cm/day.

The oceans are basically separated into three identifiable regions. The surface, or euphotic zone, is generally identified as the top 100 meters and represents the mixed-surface layer where direct interaction with the atmosphere and surface waters can be translated throughout the 100 meter water column. At approximately the 100 meter mark, the thermocline layer begins and extends to approximately the 300-400 meter depth and is subject to fluctuations from tidal influences and internal waves. Below the influences of the thermocline exist the depths of the ocean which are not influenced through any manner by surface phenomena. In Hawaiian waters, the deep ocean water existing below 500 meters originated primarily from around Antarctica and/or from the Arctic and has traversed thousands of miles along the bottom of the Pacific Basin over thousands of years.

Because of the availability of sunlight in the surface layers, a majority of the biological activity of the ocean occurs in the surface or euphotic zone. Photosynthesis and other biological activities in this layer utilize much of the natural nutrient content thereby making deep ocean water nearly 50% more enriched with those nutrients necessary to support natural photosynthetic activity than the surface seawater. This phenomena, coupled with the extreme cold temperatures and pressures experienced at depth, leaves little opportunity to support non-photosynthetic life—including bacteria and viruses. Therefore, void of most life with virtually no interaction or mixing with the upper layers, deep ocean water is nutrient enriched over surface water and effectively void of natural pathogens or chemical contamination from human societies.

Known ship-board water desalination systems are designed and operated for ship-board consumption of water, and thus are designed and operated according to various maritime standards. Maritime standards for water desalination systems and water quality are less stringent than those regulations, standards, and requirements governing the design and operation of land-based desalination plants and systems, especially those promulgated by the United States, the United Nations and the World Health Organization. With the world's increasing shortage of potable water, a need exists to alleviate this shortage. Thus, the need exists for methods and systems that can be utilized at sea to provide desalinated water for land-based consumption of water, which can be produced, stored, maintained and transported consistent with those regulations, standards and requirements governing the design and operation of land-based water desalination plants, systems and water quality standards. Furthermore, all of these known systems harvest water from the immediate vicinity of the ship, and thus the water they extract is from within a few feet of the ocean surface.

What is therefore now needed is a new source of clean, safe, cost-effective potable water. The present disclosure addresses this and other needs.

SUMMARY

In a first embodiment disclosed herein, a composition of matter comprises desalinated sea water extracted from a depth in excess of 400 meters below the sea surface.

In another embodiment disclosed herein, a method of providing potable water comprises extracting sea water from a depth in excess of 400 meters below the sea surface, and desalinating the extracted sea water.

In a further embodiment disclosed herein, a system for providing potable water comprises a ship, a desalination plant mounted aboard the ship, and a pump configured to pump sea water from a depth in excess of 400 meters below the sea surface for desalination in the desalination plant.

In further embodiments, the extracted sea water may further be filtered to remove impurities other than salt, disinfected, sterilized, clarified, have its hardness adjusted, have its pH adjusted, and/or have free chlorine removed.

These and other features and advantages would become further apparent from the detailed description and accompanying figures that follow. In the figures and description, numerals indicate the various features, like numerals referring to like features throughout both the drawings and the description.

Like reference designations represent like features throughout the drawings. The drawings in this specification should be understood as not being drawn to scale unless specifically annotated as such.

DETAILED DESCRIPTION

Utilizing deep ocean water as the feed source for the reverse osmosis operation can provide a feed stream quality unmatched in water purity and turbidity by any surface feed water source. Deep ocean water, with no interaction with bottom turbulence, is expected to be harvested at around 0.05 NTU (nephelometric turbidity units) while normal surface seawater fluctuates between 0.3 (open ocean) and 3.0 NTU (harbor/near shore) and normal municipal tap water is 0.3 NTU. Deep ocean water is at least an order of magnitude cleaner of suspended solids than these other sources.

In view of the considerations set forth above, the present disclosure contemplates the use of deep ocean water, especially from off-shore locations, as the ideal resource for future water supplies for individuals and communities interested in maintaining reliable, safe drinking water standards void of natural pathogens and human contamination.

Figure 1:
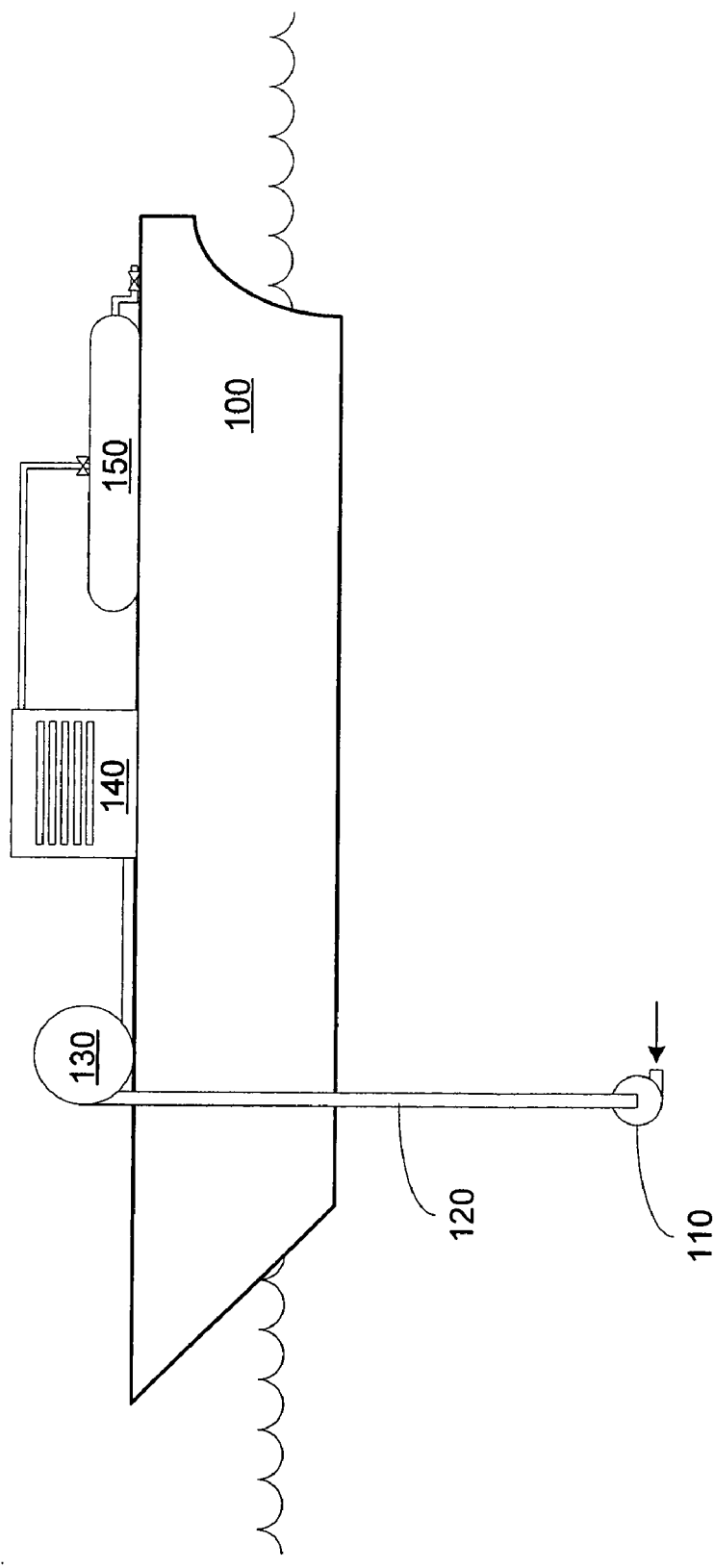
FIG. 1 is diagram representing one system according to the disclosure.

With reference to FIG. 1, a ship or vessel 100 houses the sea water extraction system, desalination system, and desalinated water storage. The water extraction system may comprise a sea water pump 110 that pumps sea water into a flexible pipe or riser 120 onto the ship, where it is transferred to the desalination plant 140. The riser is stored on and deployed by a winch system 130. In the embodiment shown in FIG. 1, the pump 110 is a submersible pump that is disposed at the submerged end of the riser 120 and is thus deployed into the sea to the predetermined depth from which sea water is to be extracted. It must be understood that the type and design of the pump is not relevant to the main inventive concept presented herein and any practicable pump design may be employed within the scope of the present disclosure.

Similarly, the desalination plant may be of any practicable type within the environment of a sea-going vessel and may employ any desalination technology currently known or yet to be developed, including distillation and reverse osmosis. Again, the actual method of removing salt as well as any other minerals and particulates from the extract sea water is also not relevant to the main inventive concept presented herein, and solely for ease of discussion a preferred embodiment is discussed with reference to the use of reverse osmosis (RO).

The extracted sea water that has been desalinated in the desalination plant 140 can be stored on board the ship 100 in storage 150. This design would thus allow the system to operate at seas for extended periods of time and return to port when the storage 150 is filled to capacity with desalinated sea water, so as to discharge the desalinated sea water for transfer to a distribution/bottling facility. The storage 150 may also be any practicable design given the requirements of a sea going system, but the particular type of storage chosen is also of no relevance to the main inventive concept of the disclosure.

Thus, in one embodiment discussed below, the use of a bladder system is described, as it offers advantages of cost, weight, expandability, and durability in an ocean environment.

Figure 2:
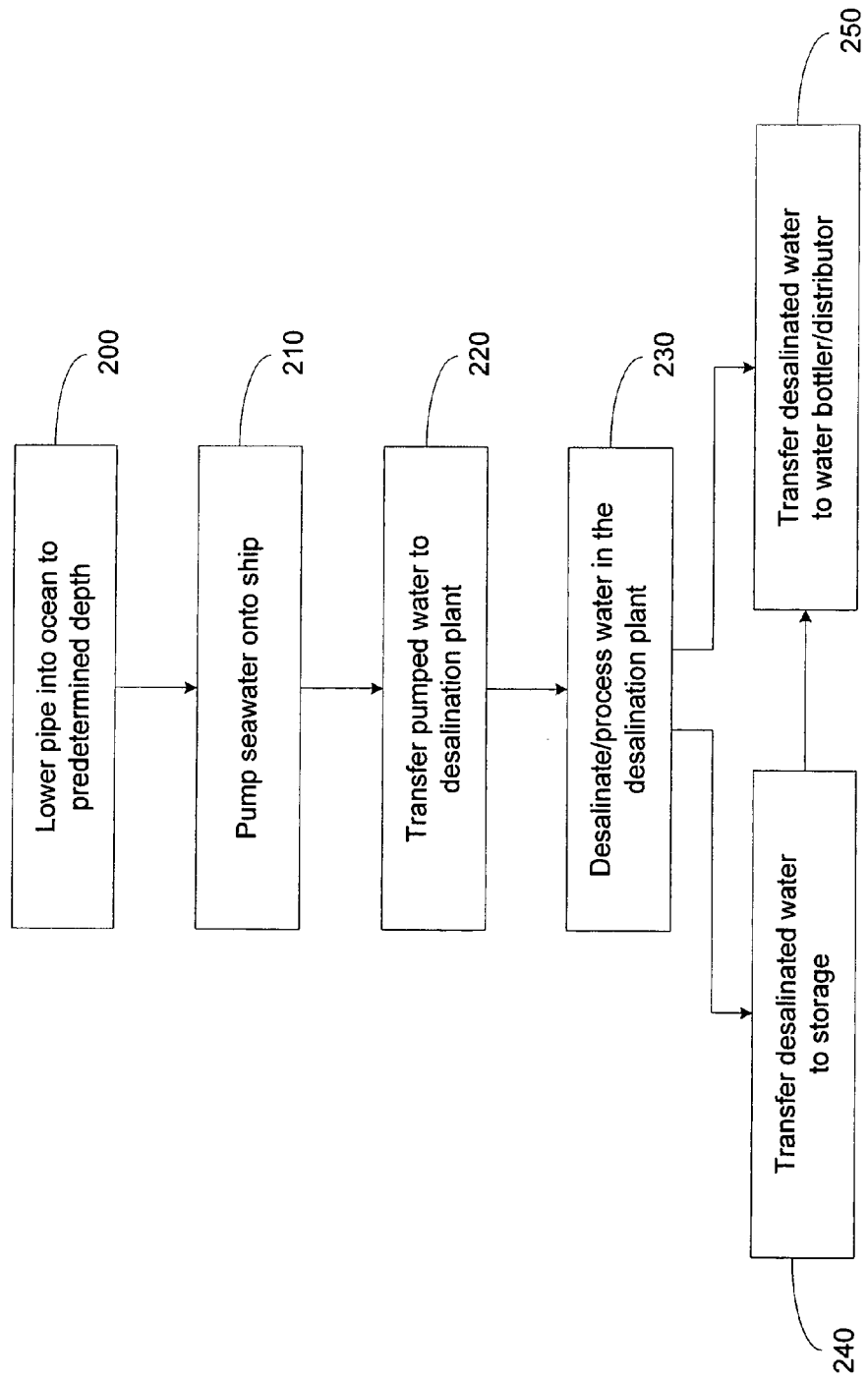
FIG. 2 is a flowchart depicting one method according to the disclosure.

Thus, with reference now to FIG. 2, in one embodiment according to the present disclosure, a method for obtaining potable water entails lowering 200 the sea extraction riser or pipe 120 to a predetermined depth into the ocean (as has been mentioned, a depth of at least 400 meters is visualized as offering the desired environmental variables as discussed elsewhere herein). In the exemplary embodiment of FIG. 1, the sea water extraction pump 110 is deployed at the submerged end of the riser, and thus the pump is lowered as well as part of this step. Once the riser (and, optionally, the pump) has been deployed to the desired depth, the pump 110 is operated to pump sea water 210 on board of the ship, where the extracted sea water is transferred 220 to the desalination plant 140. The desalination plant removes salt 230 from the extracted sea water. Practically speaking, at this stage it may be found desirable to perform further processing of the extracted sea water, such as filter the water to remove particulates, and apply other processes to extract other selected minerals. Although the embodiments described herein envision extracting water from a depth where no microorganisms live, the skilled person practicing the method of the invention would understand that the extracted sea water may further be processed to remove any such living microorganisms.

In one embodiment, an ocean-going vessel would house the recovery and desalination system. On a vessel of 194' length, we estimate that the surface deck (for a vessel with two decks) can hold twenty four 20' bladder containers stacked two high (according to the ships captain). This would allow for storage of 48 filled containers per trip to the at-sea operations site. The design includes provisions for linear growth of the system to meet production increases and ideally all sub-systems would be designed to accommodate such linear growth potential.

The harvesting area would preferably be in waters in excess of 1000 meters, generally located 3 to 5 miles offshore. A natural thermocline has been shown, on rare occasion, to have influence on oceanic waters up to depths of 400 meters due to internal wave action. Water would therefore preferably be harvested from the vessel at a depth of at least 400 meters, and more preferably 600 meters, ensuring no interaction from the thermocline and no risk of encountering benthic turbidity. The water extracted from such depths would be approximately 6° C., and the on-board desalination facility should be designed to accommodate water at these temperatures.

To enhance production capacity, the water harvesting system is preferably designed for rapid deployment and portability. In one embodiment, the developed design would provide deep ocean water from depths of approximately 600 meters at a rate of 350 gallons per minute (GPM). This procurement system would feed a desalination plant such as a reverse osmosis (RO) facility consisting of redundant units designed to produce 70 GPM of potable water with a Total Dissolved Solids (TDS) range of 350-400 ppm (typical of tap water levels). The RO system can expect maintenance requirements of approximately 5% of operational time. With redundant facilities, one can easily be serviced while the other is operational without interfering with ship production. Also, with the system designed well over required capacity, maintenance of the systems can easily be performed at minimum risk of production loss.

Of course, operational redundancy of all relevant system components should be taken into consideration and would be provided in the plant ship design. Each critical component should have at least one replacement on-board the production vessel to be used during routine maintenance procedures or in case of malfunction or other difficulty. These precautions are necessary to ensure that production interruption is extremely unlikely except for periods of heavy seas at which time the production vessel can be housed safely in port.

In one exemplary embodiment, the Product Water Storage/Transport System (PWSTS) may consist of a polypropylene bladder inside a standard 20' container for ease in handling and transport of the product permeate to any location or customer, globally. To meet international trucking cargo weight and dimension standards, the bladder containers may be restricted to 5,500 gallons each. The permeate product may be pumped directly from the RODS system to each container through high-grade potable water polyethylene pipes to each storage bladder container as located on the production vessels deck. Based upon the production vessel's stability characteristics, it is anticipated that the containers can be safely stacked two high during production operations, effectively doubling the production capabilities for the available deck surface area per harvesting excursion.

The bladder containers are typically reusable, interchangeable and easily handled. It is anticipated that prior to filling the container from the RO plant, each new and/or used bladder would be sterilized with chlorine then rinsed out with product water. This would ensure that no organics or bacteria have been introduced to the sterile environment of the bladder prior to filling with your product. Deep ocean water supports little or no bacteria or other life-forms that can create a problem and therefore, heavy chlorination of the bladders for long-term water storage should not be necessary as would be the case for water produced from surface sources.

Figure 3:
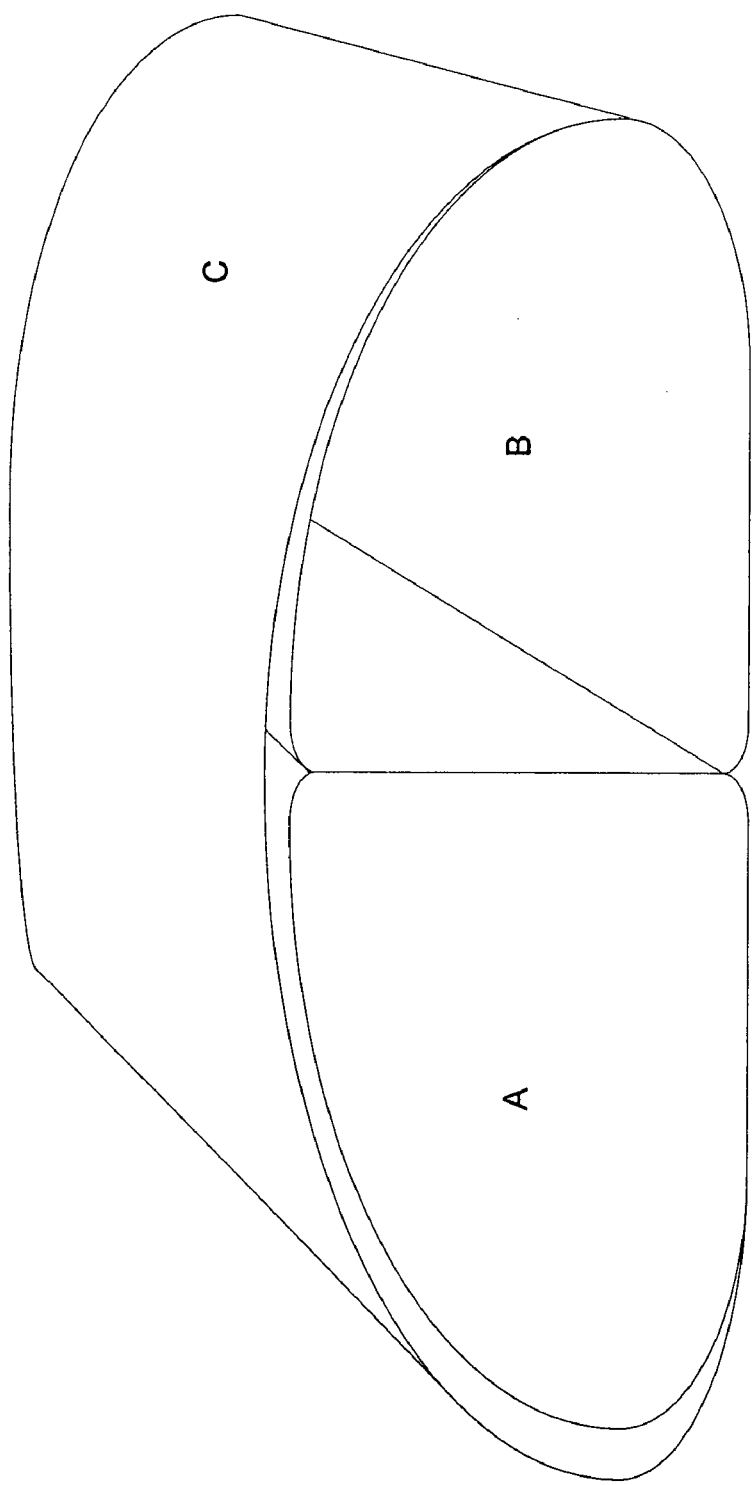
FIG. 3 is a perspective sectional view of a tube bladder storage tank that may be used within the present disclosure.

FIG. 3 represents a cross section of a typical tube-bladder (TB), illustrating the two inner tubes which contain the water and the "master" tube that keeps the inner tubes parallel and in contact with each other. A and B illustrates the two inner tubes inflated with water. C is the outer or "master" tube made of very tough polypropylene woven textile fabric which confines the water filled inner tubes, making the TB a solid wall of water. These two confined columns of water provide the mass, weight, and pressure that gives the TB its stability inside the container.

The tube-bladders that could be utilized in the present system may be constructed and fitted to the standard 20' container prior to loading on the production vessel. Preparation of the bladder container may consist of constructing the bladders in 20' lengths with both ends closed with a built-in intake/discharge hose configured with an over-pressure valve to prevent overfilling of the bladder. The bladder may be designed to hold 5,500 gallons of permeate. A wooden frame may be built into each container to hold and stabilize the bladder during handling and shipping procedures.

The Deep Ocean Water Harvesting and Desalination production plant operating parameters should be monitored and recorded at a control center on board the vessel. The control center may serve as a central hub for the shipboard information systems integrating the data from the various sensors to assure and document the quality and location of the product.

The source water positioning sensors may consist of a differential global positioning satellite receiver recording latitude and longitude of the ship with sub meter accuracy. A pressure sensor may be attached to the submersible pump to allow the pump depth to be monitored and horizontal layback would be calculated from the known scope of riser. The data from these sensors may relay to computers in the control center where it could be processed, recorded, and displayed for monitoring by the operator on watch.

The feed water system may include sensors to monitor the pressure from the feed water supply tank to accurately track the level of the feed water and allow immediate shutdown if feed water pressure reaches a minimum set point. Levels and pressures may be displayed in the control center, allowing the operator to adjust system parameters accordingly.

The reverse osmosis plant may be instrumented with sensors to monitor feed water quality, permeate quality, system flow rates, and pressures. Set points can be programmed to autonomously control the operating parameters using a programmable logic control facility. All operating parameters may be displayed for the operator on watch to ensure safe plant operations. Historical records may be maintained to asses the lifecycle performance of the plant and determine required maintenance routines.

Relevant flow and quality data may be recorded with source water positioning information for each operational cycle and lot numbers issued certifying the deep seawater product.

In one exemplary embodiment, the product water may be designed for delivery at between 350-400 ppm TDS which meets or exceeds international drinking water standards. The water may be designed for delivery at these levels to leave in the natural minerals so important to the deep seawater product and allow for the individual customer to customize their final product according to their market needs. Thus, in one exemplary embodiment, the system disclosed herein may be designed to function as a commodity broker of "raw" desalinated deep seawater.

Deep seawater contains several minerals essential for human health and proper bodily function such as magnesium, calcium, potassium, sodium, iron and phosphorus. It is anticipated that each of these minerals would be duly representative in deep water and may thus be retained in the desalinated water.

Due to the globally unique nature of the designed harvesting system, the systems disclosed herein would be able to extract its deep ocean water from mid-depth regions far away from either surface influences or from turbidity commonly found near the bottom (through geological and other disturbances). Unlike with other techniques currently employed for deep ocean water harvesting, should an operator of the present system encounter obvious turbidity issues or other water quality problems, the operator can immediately move the production facility (i.e. the system) to a more pristine or clean resource—as the system would not be confined to a specific location. This provides a distinct marketing edge over competitors with fixed deep ocean water desalination facilities.

In one exemplary embodiment, the deep ocean water harvesting and desalination technology described herein may be divided into four (4) principal integrated system components designed for easy modification to accommodate various production vessel configurations:

1. The deep water harvesting system.
2. The reverse osmosis desalination system.
3. The product water storage/transport system.
4. Data acquisition/recording and quality control system.

The deep water harvesting system is responsible for the acquisition of the deep ocean water feed product for the desalination system. The Deep Water Harvesting System (DWHS) may be comprised of:

1. A submersible sea water pump/motor required to pump the sea water from 600 meters depth.
2. A flexible riser with armored electrical cable and safety cable.
3. A deployment and recovery system for the pump and riser.

The submersible pump is connected to the flexible riser and is supplied power by the armored electrical cable connected to the ship's power unit. The flexible riser serves a dual purpose as both transport medium for the desired deep ocean water feed product and as the load bearing component supporting the weight of the submersible pump, motor and weight required to maintain a vertical pipe. It also serves to resist the initial torque experienced during pump start-up.

A slack armored safety cable has been incorporated in the system design to protect against potential pump and riser loss due to shark bites or riser failure. Should such an unlikely event occur, the armored safety cable would allow for retrieval of both the pump and the riser portion attached to the pump which can be patched and reused after repair.

The submersible pump and flexible riser, which stores flat when not filled with product water, is deployed or retrieved over the stern of the production vessel (or, through a moon pool if the production vessel is so equipped) via the specially modified winch system. Once the full length of the flexible riser has been paid out by the winching system (estimated at approximately 30 minutes for deployment or retrieval under current winch design), the riser is connected (via a stainless steel flange) to a piping system which discharges the deep ocean feed water product into one of the ship's bilge tanks which has been cleaned and lined for potable water usage.

Once the pump and riser have been successfully deployed and properly connected to the production vessel's storage tank, the pump would be powered up utilizing the ship's power and the deep ocean water would begin to fill the bilge storage tank. This tank would then serve as the boundary of the DWHS and would provide the break between the DWHS and the RO Desalination System necessary to provide integrated system separation for the RO operational pumps. Each of the DWHS system components is described in detail in the following sections.

As previously noted, the sea water pump may be designed to harvest deep ocean water from depths approximating or exceeding 600 meters. One exemplary embodiment utilizes a standard Crown Submersible Turbine Pump Model No. 7M-340-3 manufactured of all 316SS (stainless steel) cast construction with a 4" discharge providing 350 gpm of sea water from a depth of approximately 600 meters. The pump would preferably be configured with a 316SS pump screen to prevent any biological impingement through the pump and riser which might interfere or disrupt standard system operation. All pump components would likely be high pressure tested and rated at 1000 psi.

The pump may be powered by a 6" Franklin Electric 316SS motor rated at 30 hp, 460 v/3 phase operating at 3450 RPM and tested at 1000 psi. The motor may be configured with a PVC shroud to ensure proper water flow past motor unit to maintain required cooling. The motor may also be protected with a Model 777 motor saver electronic overload relay and control panel. The control panel would provide a 60 amp thermal magnetic circuit breaker, an 85 amp across the line magnetic motor starter with 120 VAC coil and a 480×120V control circuit transformer. Relevant operational and design considerations are included and highlighted in the following tables and diagrams supplied by the manufacturer for the current design system parameters.

The submersible pump cable would consist of a Chlorinated Polyethylene (CPE) rubber flat, extra flexible "Hydroflex" heavy duty cable. The CPE housing would protect a #1/0-3 conductor with ground cable approximately 685 meters (2250 feet) long required to provide power to the submersible pump motor. The cable would run the entire length along the riser with strap connections as described in the following section.

A flexible riser configuration was determined to be one possible ideal deep ocean water transport medium for providing optimal production vessel/plant mobility with maximum ease of pump/pipe deployment and retrieval. To meet these requirements, the flexible riser brand chosen for implementation in this system is Boreline which is manufactured by Hose Manufacturers (Pty) Ltd. in South Africa and distributed by Hose Solutions, Inc. in the United States. Boreline was originally designed as a long lasting replacement for steel riser pipes for mine dewatering and deep well applications, which in aggressive water conditions are prone to rust and encrustations. Extremely cost-effective and with very little downtime or maintenance required, the flexible rising main has been designed to simplify the work involved in installing and removing the submersible pump. The flexible riser is constructed from high tenacity polyester yarns, which are circular woven and then totally encapsulated to form an integrated cover and lining of a high performance polyurethane elastomer, which is approved for use with potable water. This material configuration provides excellent resistance to abrasion resulting in a durable riser that has excellent operational history in caustic environments as would be experienced in this open ocean application.

The riser is lightweight, flexible and flat and is supplied in compact rolls. It is easily stored and handled in comparison to steel or other competing pipeline alternatives and conducive to safe working conditions for our production vessel operators.

The Boreline riser material is available in any continuous lengths of up to 300 m (1000 feet). In one exemplary embodiment, two 300 meter lengths may be joined by a 316 SS couple for a total riser length of approximately 600 meters. At the pump end a double-ring coupling may be screwed into the non-return valve and attached to the hose. On the upper end the coupling screws into the base plate or head works. This simple operation greatly reduces the installation or retrieval time of the system (i.e., less labor is also required).

The riser material should be resistant to corrosion, scaling and biological growth. Due to the nature of the Boreline material, scaling does not build-up internally thereby maintaining its efficiency throughout its life. Another important feature of this riser material is that it does not support algae growth. Tests performed by the manufacturer and repeated by the Water Research Centre (U.K.) have shown that algae would not grow on the riser material. Although pumping deep ocean water in which algae growth should not be a consideration, the riser would pass through the euphotic zone and resistance to algae growth is an added plus in ensuring system availability and minimizing maintenance requirements. The Boreline riser is designed to be UV stabilized to avoid any degradation; however, it would be stored out of direct sunlight when not in use or during backup service to prolong riser performance life.

The Boreline riser embodiment may incorporate a cable support rib which runs the entire length of the hose allowing the electrical cable to be attached to the hose using re-useable cable straps. This cable support rib, which is applied during manufacture, could form an integral part of the hose. The connection points could be based at 1 m intervals.

The flexible riser may be fitted with fully re-usable couplings each comprising of the body and two outer fastening clamps. The body of the coupling contains two ribs over which the hose fits and the clamps are tightened. The two fastening clamps are split into three equal parts. The materials of construction are 316 stainless steel for use with drinking water or where water is of an aggressive nature as is this application. The couplings are supplied with BSP male thread for attachment to the pump at one end and the head works at the surface on the production vessel. The table below shows the relevant design parameters for the Boreline riser under our conditions for the riser dimension (4") required for this design (highlighted in yellow). Table 1 shows the anticipated head loss for the 4" riser for various flow rates (design flow rate of 350 gpm applies).

TABLE 1

| | Nominal Size | | | | | |
|---|---|---|---|---|---|---|
| | 1½" | 2" | 3" | 4" | 5" | 6" |
| Inside diameter | 40 mm | 50 mm | 76 mm | 102 mm | 127 mm | 152 mm |
| Theoretical burst pressure | 920 psi 65 bar | 920 psi 65 bar | 850 psi 60 bar | 820 psi 58 bar | 800 psi 58 bar | 800 psi 58 bar |
| Operating pressure | 425 psi 30 bar | 425 psi 30 bar | 350 psi 25 bar | 350 psi 25 bar | 310 psi 22 bar | 310 psi 22 bar |
| Theoretical tensile strength | 6600 lbs 3000 kgs | 8800 lbs 4000 kgs | 17600 lbs 8000 kgs | 26400 lbs 12000 kgs | 35200 lbs 16000 kgs | 44000 lbs 20000 kgs |
| Weight of boreline | 0.34 lbs/ft 0.50 kg/m | 0.37 lbs/ft 0.55 kg/m | 0.64 lbs/ft 0.95 kg/m | 0.94 lbs/ft 1.40 kg/m | 1.14 lbs/ft 1.70 kg/m | 1.68 lbs/ft 2.50 kg/m |
| Outer diameter of coupling | 3.25 in 80 mm | 3.75 in 95 mm | 5.55 in 140 mm | 6.50 in 165 mm | 7.90 in 200 mm | 9.10 in 230 mm |
| Weight of | 6.8 | 7.7 | 16.6 | 22.1 | 32.0 | 40.0 |

TABLE 1-continued

|  | Nominal Size | | | | | |
| --- | --- | --- | --- | --- | --- | --- |
|  | 1½" | 2" | 3" | 4" | 5" | 6" |
| coupling | lbs<br>3.10<br>kgs | lbs<br>3.50<br>kgs | lbs<br>7.50<br>kgs | lbs<br>10.00<br>kgs | lbs<br>14.50<br>kgs | lbs<br>18.10<br>kgs |
| Weight of water | 1.30<br>lbs/ft<br>1.94<br>kg/m | 1.52<br>lbs/ft<br>2.25<br>kg/m | 3.42<br>lbs/ft<br>5.10<br>kg/m | 6.10<br>lbs/ft<br>9.05<br>kg/m | 9.50<br>lbs/ft<br>14.15<br>kg/m | 13.7<br>lbs/ft<br>20.35<br>kg/m |

A summary of the preferred characteristics of the selected riser includes:

Corrosion free and does not scale;
Not subject to microbiological attack;
High Tensile Strength;
Good hydraulic performance;
Good flow rates;
Available in large continuous lengths;
Light weight and rolls flat;
Easy to store, handle and transport;
Quick and easy to install and retrieve;
Potable water approved;
Advantageous in restricted working area;
Water Research Advisory Council approved;
BS6920 accredited;
Long life expectancy.

The deployment and recovery system may be an electro-hydraulic winch designed to accommodate the flexible riser and submersible pump. Hydraulic power for actuation of the winch may be provided by a hydraulic pump and electric motor. The hydraulic system of the winch may be self contained, with pump, motor, and reservoir integrated into the deployment and recovery system. Particular design considerations of the winch system include minimizing head loss due to the bend radius of the over-boarding sheave, the power required for recovery at full deployment, level-wind spooling of the riser on drum, and accommodation of the mid-riser coupling.

Specifications for one exemplary embodiment of the DRS include an empty drum pull capacity of 3500 lbs, 60 fpm line speed, 2000 feet of 4" flexible riser, flat-lay riser width of 6.30" and thickness 0.59", a 6.50" diameter rigid coupler 19.68" long at 1000 ft, and no rotary union required.

The design may further incorporate the use of a 20 HP pump/motor to provide the required pull with allowance for dynamic loading. A winch drum of 36" in diameter would allow the rigid riser coupling to spool onto the winch while minimizing stresses on the flexible riser. A cradle to secure the submersible pump and motor may be integrated into an A-frame actuated by hydraulic cylinders to lower the submersible pump overboard. A modified diamond screw level-wind could incorporate pinch rollers to ensure the riser does not fold as the levelwind pushes it sideways. The levelwind rollers should be able to be disengaged by the operator to allow the rigid coupling to pass through. Concurrent spooling of the riser and attached pump power cable, instrumentation cable, and safety wire would not be an issue as these other cables are not in tension under normal operations.

All equipment necessary for the deployment, operational support, and retraction of the water pump and riser could be contained within one 40 foot standard cargo shipping container (dimensions: 40' long, 8' wide, 8.5' high). To provide additional structural support, a frame could be inserted within the cargo container (frame dimensions: 20' long, 7.5' wide, 8' high). The support frame could be manufactured from 4 inch "U-beams" and contain the majority of the winch assembly components.

The pump, attached to the end of the riser and fitted with weights necessary to achieve full depth in current, may be positioned closest to the container opening. The attached riser could be threaded immediately above and through a pulley guide on the end of a weight-bearing sliding boom. The riser continues through the level wind to the supplying winch/windlass mechanism.

The boom, winch/windlass, and level wind could be hydraulically actuated by a hydraulic pump and motor positioned and controlled from directly behind the winch. The winch/windlass and level wind could be geared directly to the pump/motor. Cables for boom actuation could be belt driven.

The weight-bearing, sliding boom could consist of a 38' foot steel beam within a 20 foot steel outer sleeve. The sleeve could be fixed to structural support above the spool and motors. The weight bearing boom with pulley guide at one end and counter weights at other end, could provide an extension for clearance from side of vessel.

Electric power for the hydraulic pump and motor as well as the submerged water pump could be provided by portable electric generators that could be positioned in the far aft of the container to augment any necessary counterweight for boom extension and water harvesting.

All equipment could be offset to one side of container centerline to take advantage of structural support provided by the container wall as well as to provide clearance for crew movement and access for equipment maintenance.

For deployment, crewmen would actuate the winch to lift the water pump and weights from the floor of container. The boom would then be extended to clear the pump and weights from the side of vessel. Once at extension, the winch would be actuated to lower the riser, pump and weights to target depth (2000 feet). The weight of the pump/cable/weights/riser would be held by an armored metal cable simultaneously deployed by the interconnected windlass and secured by integrated straps at 100 meter intervals along the riser.

When winch/windlass rotation is ceased at target depth, the mechanism would be mechanically locked. With the security cable bearing the riser weight, the open end of the riser would be removed from the spool and connected to a manifold secured to the structural frame providing additional weigh bearing capacity as well as a path for harvested water through the riser and manifold out of the DRS container to a separate water reservoir.

Water harvesting would commence when the underwater pump is electrically activated and powered by portable electric generators within DRS assembly container.

For retraction of the water pump and riser, the above process would be reversed. The pump would be deactivated and follow-on piping would be disconnected from the riser at the manifold. The winch/windlass would would activated to retract both riser and security cable while the level wind, mechanically linked to the winch/windlass, aligns riser along spool axel. At full retraction with pump and weights suspended beneath boom, the boom would be withdrawn and once inside the container, pump and weights lowered to the container floor.

Freshwater from a post RO, on-board reservoir could be sprayed onto the riser during retraction to minimize the corrosive effects of seawater within the DRS. The floor of DRS could be raised to permit drainage of this and other freshwater spayed within the container minimize corrosion.

During harvesting operations the DRS would be operated by one or two technicians un-securing the submersible pump and manning the A-frame and winch drum controls. The riser is deployed the full length, winch drum secured, and connections made from the riser to the shipboard feedwater systems before powering the submersible pump.

The Reverse Osmosis Desalination System (RODS) begins in the production vessel's potable water lined bilge tank which stores the deep ocean water provided by the DWHS. This deep ocean water now functions as the feed water raw material for the reverse osmosis desalination process. A standard 316SS submersible well pump would pump the deep ocean feed water to the containerized Sea Water Reverse Osmosis (SWRO) system for desalination and processing. The SWRO is a completely self-contained RO plant such as those manufactured by HOH USA & Carib Ltd. or by Severn Trent Water Purification, Inc. (www.severntrentservices.com). One current embodiment incorporates two (2) SeaRO-300ERS 75,000 GPD (300 m$^3$/day) SWRO containers to meet business plan production objectives while providing linear growth opportunities without further capital investment. Another embodiment contemplates one 80,000 GPD unit Manufacturer suggests a 30% by volume permeate efficiency (30% of feed water converted to permeate with 70% rejected) due to the lower feed water temperature anticipated over conventional SWRO systems. To provide conservative estimations in our design, the production capacities assumed a 25% permeate efficiency in our business plan projections.

The product permeate from the RO system would be pumped directly to the product water storage/transport system for storage until offloaded and shipped/trucked to the end client. The product permeate would be designed for delivery with a total dissolved solids (TDS) rating of 350-400 ppm.

The manufacturer suggests that the designed SWRO system can expect maintenance requirements of approximately 5% of operational time. With redundant facilities, one can easily be serviced while the other is operational without interfering with ship production. Also, with the system designed well over required capacity, maintenance of the systems can easily be performed at minimum risk of production loss or delay.

Regarding the water supply, it is noted that feed water for supply of seawater reverse osmosis (SWRO) plants in general can be divided into three (3) main categories:

(1) Low salinity brackish water with Totally Dissolved Solids (TDS) of up to 5,000 milligrams per liter (mg/l) or parts per million (ppm).
(2) High salinity brackish water with TDS in the range of 5,000 to 15,000 ppm.
(3) Seawater with TDS in the range of 25,000 to 40,000 ppm.

The quality of the feed water is defined in terms of the concentration of suspended particles of saturation levels of the sparingly soluble salts. The common indicators of suspended particles used in the reverse osmosis (RO) industry are turbidity and Silt Density Index (SDI). The maximum limits are: Turbidity of 1.0 NTU and SDI of 5.0. Continuous operation in excess of these values may result in significant membrane fouling. For long-term, reliable operation of the RO unit, the average values of turbidity and SDI in the feed water should not exceed 0.5 NTU and 2.0 SDI units, respectively.

Depending on the raw water quality, the pretreatment process in conventional RO systems may consist of all or some of the following treatment steps:
 Removal of large particles using a coarse strainer;
 Water disinfections with chloride;
 Clarification with or without flocculation;
 Clarification and hardness reduction using lime treatment;
 Media filtration;
 Reduction of alkalinity by pH adjustment;
 Addition of scale inhibitor;
 Reduction of free chlorine using sodium bisulphate or activated carbon filters; and/or
 Water sterilization of suspended particles using cartridge filters.

However, the resource water from depths in excess of 500 meters in the open ocean are expected to yield turbidities of approximately 0.05 NTU which is an order of magnitude less than what is traditionally experienced in coastal SWRO systems as is considered in the description above. Therefore, since the anticipated turbidity of the feed water is far below the operational requirements, the pretreatment processes described above are not necessary to support the SWRO system for deep ocean desalination. The life expectancy of the process membranes should be significantly greater than more traditional SWRO systems operating with surface seawater as its feed source.

Containerized SWRO systems manufactured by HOH USA & Carib Ltd or Severn Trent Water Purification Inc. (www.severntrentservices.com), specializing in modularized low energy reverse osmosis sea water desalination plants (SWRO-plants) with individual capacities up to 1,000 m$^3$/day ~264,000 GPD, may be employed. The SWRO-plants, including pretreatment, post treatment and CIP (clean-in-place) facilities could be assembled in 20-ft and 40-ft containers. For this design, two (2) SeaRO 300ERS (or SeaRO 25ERS depending upon the manufacturers notation) facilities each producing 75,000 gpd (300 m$^3$/day) in 20' containers, or one UAT-80K-PURE-PRO facility producing 80,000 gpd (300 m$^3$/day), inter alia, may be employed. As a standard feature, HOH's SWRO plants are designed with an efficient energy recovery system "The Pressure Exchanger" (PE), which uses less than 3.0 kWh/m$^3$ or 11.4 kWh/k-gallons. This innovation provides a 60% energy reduction in comparison to a conventional SWRO plant using 7.0 to 8.0 kWh/m$^3$~26 to 30 kWh/k-gallons. This added efficiency greatly improves the RO production costs as electrical consumption is the primary expense in the RO process.

The SeaRO 300ERS and UAT-80K-PURE-PRO are designed for remote operation, with no daily on-site operator required. Regardless, personnel are anticipated on the production vessel to maintain and operate the system as needed to minimize potential system and production disruptions. All flows may be monitored by the autonomous system provided and fail-safe measures are standard so that the plant would shut-down automatically should anything fail thereby preventing product contamination or other system damage. The flows from the well pump, the booster pump and the high-pressure pumps can be adjusted remotely by signals to the frequency converters. Water temperature, salinity and pressure in different flows can likewise be monitored and historical data saved for printout graphs showing the plant operation at any given time during operation. These systems would be utilized to record relevant operating system parameters during each production lot and cross-referenced with the GPS and depth data.

The RO system may utilize multistage centrifugal high-pressure pumps and frequency converters from recognized international manufacturing companies, with service centers world wide, to minimize maintenance requirements and down-time during pump repair. The high-pressure centrifugal pumps are controlled by frequency converters, which provide for a soft start thereby minimizing system stresses commonly associated with plant start-up procedures; effectively prolonging the life of all vital system components. The automatic start and stop function of the plant is likewise controlled by the submersible well-pump and the sensors in the production vessels lined bilge tank to further protect the integrated system from operation under unfavorable conditions. All seawater related pipelines within the containerized RO plant are manufactured in high-quality 904L-stainless steel to accommodate the sea water corrosion potential.

Table 2 represents relevant data and parameters (highlighted) that may be utilized in the design of the SWRO facilities incorporated in this design. The specifications provided below represent the standard containerized RO system for utilizing surface sea water at an ambient temperature of approximately 25° C. (77° F.). The deep ocean water would be approximately 6° C., which would require more membranes to meet production requirements of, e.g., 75,000 GPD of permeate.

TABLE 2

| Models and Specifications | STANDARD CONTAINERIZED MODELS | | | | |
| --- | --- | --- | --- | --- | --- |
| | SeaRO-100ERS | SeaRO-250ERS | SeaRO-300ERS | SeaRO-500ERS | SeaRO-1,000ERS |
| Capacities | 100 m³/day<br>26,500 USGPD<br>22,000 IMPGPD | 250 m³/day<br>66,500 USGPD<br>55,000 IMPGPD | 300 m³/day<br>79,000 USGPD<br>66,000 IMPGPD | 500 m³/day<br>132,000 USGPD<br>110,000 IMPGPD | 1,000 m³/day<br>264,000 USGPD<br>220,000 IMPGPD |
| Container Size | 20-foot | 20-foot | 20-foot | 40-foot | 40-foot |
| Membranes | Thin film helix membranes specially designed for seawater with high salt content. | | | | |
| Pressure Vessels | Made from reinforced polyester with glass fiber for an operating pressure of 1,000 bars | | | | |
| HP-Pumps | In-line installed multistage centrifugal pumps based on customer power specifications | | | | |
| Booster Pumps | In-line installed multistage centrifugal pumps based on customer power specifications | | | | |
| Power | 25 kW | 62 kW | 62 kW | 92 kW | 161 kW |
| Energy Recovery | Pressure Exchanger from Energy Recovery Inc with 60-% energy reductcon | | | | |
| Pre-filters | Micromesh pre-filters for the protection of the membranes | | | | |
| Control Panel | Build around a PLC facility for managing the automatic functions of the plant | | | | |
| Wetter Material | Made from stainless steel 904L quality specially designed for high pressure and seawater | | | | |
| Post Treatment | Consisting of a reservoir and accessories filled with dolomite sand to give permeate optimum qty. | | | | |
| CIP-System | Consisting of solution tank with mixer, circulating pump and heat exchanger. | | | | |
| Remote Control | No | Yes | Yes | Yes | Yes |
| VFC | Frequency converters for soft-start, step-less regulation and remote access | | | | |
| Permeate | Less than 500 ppm as per WHO (World Health Organization) guidelines for safe drinking water | | | | |
| Feed Water | Plant capacities are calculated based on standard seawater TDS 35,000 ppm and 25° C. (77° F.) | | | | |
| Width | 2.4 meters<br>8-feet | 2.4 meters<br>8-feet | 2.4 meters<br>8-feet | 2.4 meters<br>8-feet | 2.4 meters<br>8-feet |
| Length | 6.0 meters<br>20-feet | 6.0 meters<br>20-feet | 6.0 meters<br>20-feet | 12.0 meters<br>40-feet | 12 meters<br>40-feet |
| Height | 2.4 meters<br>8-feet | 2.4 meters<br>8-feet | 2.4 meters<br>8-feet | 2.4 meters<br>8-feet | 2.4 meters<br>8-feet |
| Weight | 3,000 kg<br>6,600 lbs | 5,200 kg<br>11,440 lbs | 5,700 kg<br>12,540 lbs | 7,000 kg<br>15,400 lbs | 11,000 kg<br>24,200 lbs |
| Foundation | We suggest an eight (8) inch concrete foundation with a 1% slope | | | | |
| Raw Water Con. | DN 50 | DN 80 | DN 80 | DN 100 | DN 100 |
| Flush Con. | DN 50 | DN 50 | DN 50 | DN 50 | DN 50 |
| Drain Con. | DN 50 | DN 80 | DN 80 | DN 100 | DN 100 |
| Permeate Con. | DN 50 | DN 50 | DN 50 | DN 80 | DN 80 |

Summary of the SeaRO 300ERS 300 m³/day—75,000 GPD System

Membranes: Made by DOW/FilmTec, thin film helix membranes (or equal). These membranes have been specially designed for raw water with a high salt content. The permeate quality is less than 400 ppm of total salt content. The membranes are installed in:

High-pressure vessels: Made from reinforced polyester with glass fibre for an operating pressure of 100 bar. The necessary pipe joints and connections are supplied along with the pipes. The pipes are mounted in:

Frame: Made of hot drawn stainless steel. These modules are built in manufacturers factory, thus minimizing site assembly time.

High-pressure pumps: 2 high-pressure multistage centrifugal pumps made by Grundfos.

Pump (booster): 1 multistage centrifugal booster pump made by Grundfos.

Energy recovery system: Pressure exchangers from Energy Recovery Inc. which provide a 60% energy savings to RO system.

Pre-filters: 1 set of micromesh pre-filters for the protection of the RO membranes (precautionary).

Control panel: Built around a PLC facility, for managing the automatic functions of the plant. The control panel is fitted with water flow meters, pressure meters with alarm; permeate conductivity meter and timer for each unit.

Connection pipes: Made of AISI 904 stainless steel, specially designed for high pressure sea water.

Post-treatment facility: Consisting of a reservoir, and accessories filed with dolomite sand AKDOLITE to give permeate the optimum consumption quality. Apart from maintaining constant pH values (7.5-8), it also helps to protect the purified water facilities against corrosion.

CIP (Clean-In-Place): For periodically cleaning of the membranes. The CIP facility consists of a solution tank with a mixer, circulating pump and heat exchanger for controlling the mix of citric acid and Ultrasil.

Summary of the UAT-80K-PURE PRO 300 m³/day—80,000 GPD System

Membranes: Made by FilmTec, thin film composite membranes packed in spiral wound configuration. These membranes have been specially designed for raw water with a high salt content. The permeate quality is less than 400 ppm of total salt content. The membranes are installed in:

High-pressure vessels: Made by Pentair from reinforced fiber glass for an operating pressure of 1000 psi. The pipes are mounted in:

Frame: Made of heavy duty stainless steel.

High-pressure pumps: 2 high-pressure multistage centrifugal pumps made by Trident Log./Kerr.

Energy recovery system: Water lubricated pressure exchangers from Pump Engineering providing energy savings to RO system.

Pre-filters: Multiple type cartridge filters from Eden Equipment for the protection of the RO membranes (precautionary).

Control panel: For managing the automatic functions of the plant.

The control panel is fitted with water flow meters, pressure meters with alarm; permeate conductivity meter and timer for each unit.

Connection pipes: Made of Duplex stainless steel, specially designed for high pressure sea water.

Fresh Water Flush: Allows permeate water to flow through all RO membranes after every shutdown to flush system.

CIP (Clean-In-Place): For periodically cleaning of the membranes.

Operational redundancy of all relevant system components should be taken into consideration and should be provided on the production vessel to improve overall system operational availability. Each critical component would have at least one replacement on-board the production vessel to be used during routine maintenance procedures or in case of malfunction or other difficulty. These precautions are necessary to ensure that production interruption is extremely unlikely except for periods of heavy seas or force majeure, at which time the production vessel can be housed safely in port or at sea as required.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations would be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . . "

What is claimed is:

1. A method of providing potable water, comprising:
    extracting sea water from a depth in excess of 400 meters below the sea surface;
    and desalinating the extracted sea water;
    wherein extracting the sea water comprises:
        lowering a submersible pump connected to the end of a flexible extraction riser to a depth in excess of 400 meters below the sea surface; and
        using the submersed pump to pump sea water onto a vessel;
    said flexible extraction riser acting as both a transport medium for the sea water being extracted and as a load bearing component for supporting the submersible pump and said flexible extraction riser being able to be stored flat when not filled with water.

2. The method of claim 1, wherein desalinating the extracted sea water comprises desalinating the extracted sea water aboard the ship vessel.

3. The method of claim 1, further comprising one or more selected from the group consisting of filtering the extracted sea water to remove impurities other than salt, disinfecting the extracted sea water, sterilizing the extracted sea water, clarifying the extracted sea water, adjusting the hardness of the extracted sea water, adjusting the pH of the extracted sea water, and removing free chlorine from the extracted sea water.

4. A system for providing potable water, comprising:
a ship vessel;
a desalination plant mounted aboard the ship vessel;
a pump configured to pump sea water from a depth in excess of 400 meters below the sea surface for desalination in the desalination plant;
wherein the pump is a submersible pump configured to be lowered to a depth in excess of 400 meters below the sea surface to pump the sea water onto the vessel for desalination in the desalination plant; and
a flexible extraction riser attached at one end to the ship vessel and at the other end to the pump, said flexible extraction riser adapted to act as both a transport medium for the sea water being pumped and as a load bearing component for supporting the pump when lowered, said flexible extraction riser being able to be stored flat when not filled with water.

5. The system of claim 4, wherein the desalination plant is further configured to perform one or more selected from the group consisting of filtering the extracted sea water to remove impurities other than salt, disinfecting the extracted sea water, sterilizing the extracted sea water, clarifying the extracted sea water, adjusting the hardness of the extracted sea water, adjusting the pH of the extracted sea water, and removing free chlorine from the extracted sea water.

6. The method of claim 1 wherein the step of desalination is carried out using reverse osmosis.

7. The method of claim 1 further comprising the step of storing the desalinated water on the vessel.

8. The method of claim 7 wherein the step of storing comprises storing the desalinated water in bladders.

9. The method of claim 7 wherein the step of storing comprises storing the desalinated water in bladders placed in containers.

10. The system of claim 4 further comprising an electrical cable joining the pump to a power unit on the vessel.

11. The system claim 4 further comprising a slack armored safety cable connected to one or both of the riser and the pump.

12. The system of claim 4 further comprising a winching system for lowering and raising the pump and the riser.

13. The system of claim 4 wherein the pump and the riser are contained in a cargo shipping container when not deployed.

14. The system of claim 12 wherein the pump, the riser, and the winching system are contained in a cargo shipping container when not deployed.

15. The system of claim 4 wherein the desalination plant is a reverse osmosis desalination plant.

16. The system of claim 4 wherein the desalination plant is containerized.

17. The system of claim 4 further comprising one or more storages on board the vessel for containing the potable water produced by the desalination plant.

18. The system of claim 17 wherein the storages comprise one or more bladders.

19. The system of claim 18 wherein the one or more bladders are contained in a container.

20. A system for providing potable water, the system being adapted for being mounted on a vessel and comprising:
a desalination plant;
a pump configured to pump sea water from a depth in excess of 400 meters below the sea surface for desalination in the desalination plant, wherein the pump is a submersible pump configured to be lowered to a depth in excess of 400 meters below the sea surface to pump the sea water onto the vessel for desalination in the desalination plant;
and a flexible extraction riser for transferring the sea water from the pump to the vessel wherein the flexible extraction riser is adapted to act as both a transport medium for the sea water being pumped and as a load bearing component for supporting the pump when lowered, said flexible extraction riser being able to be stored flat when not filled with water.

21. The system of claim 20 further comprising an electrical cable for joining the pump to a power unit on the vessel.

22. The system of any one of claims 20 and 21 further comprising a slack armored safety cable connected to one or both of the riser and the pump.

23. The system of claim 20 further comprising a winching system for lowering and raising the pump and the riser.

24. The system of claim 20 wherein the pump and the riser are contained in a cargo shipping container when not deployed.

25. The system of claim 24 wherein the pump, the riser, and the winching system are contained in a cargo shipping container when not deployed.

26. The system of claim 20 wherein the desalination plant is a reverse osmosis desalination plant.

27. The system of claim 20 wherein the desalination plant is containerized.

28. The system of claim 20 further comprising one or more storages on board the vessel for containing the potable water produced by the desalination plant.

29. The system of claim 28 wherein the storages comprise one or more bladders.

30. The system of claim 29 wherein the one or more bladders are contained in a container, said one or more bladders each containing two inner tubes, said two inner tubes being in contact with each other and confined within a master tube.

* * * * *